March 5, 1935.  E. A. REID  1,993,116
AUTOMATIC ELECTRICAL HUMIDIFIER
Filed June 16, 1933  3 Sheets-Sheet 3
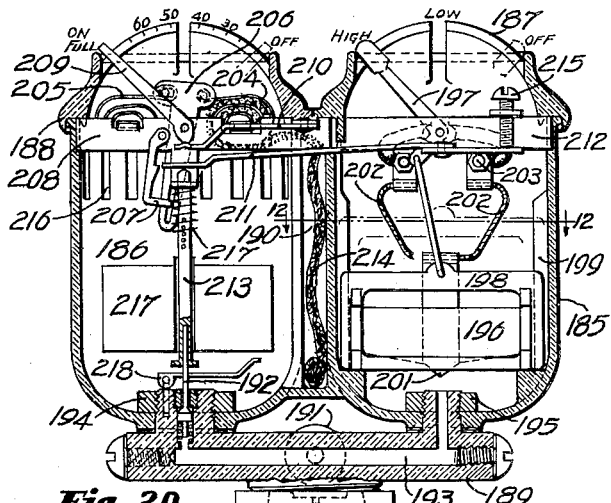
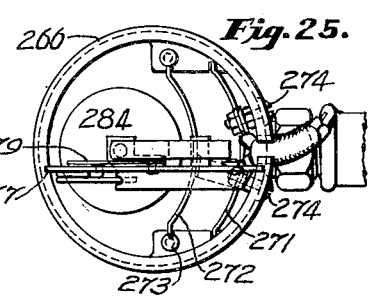
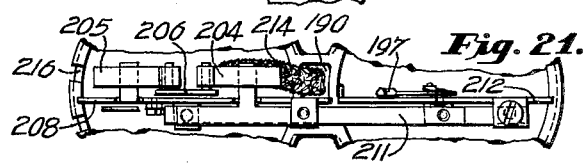
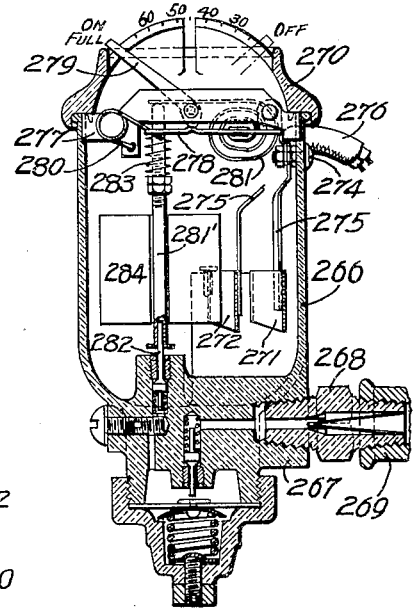
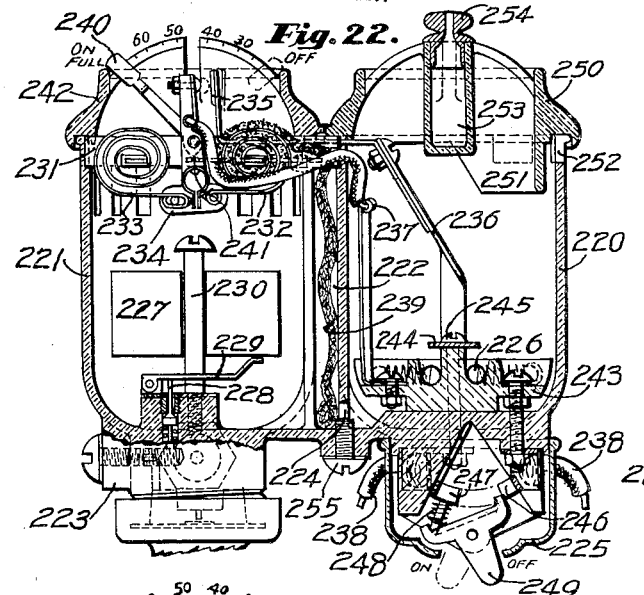
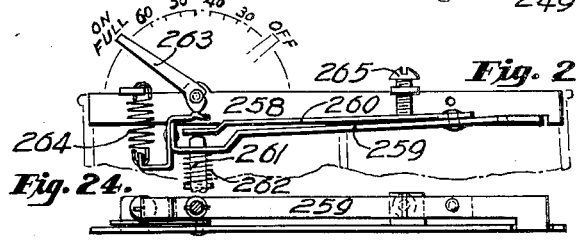
Inventor
Elmer A. Reid Patented Mar. 5, 1935

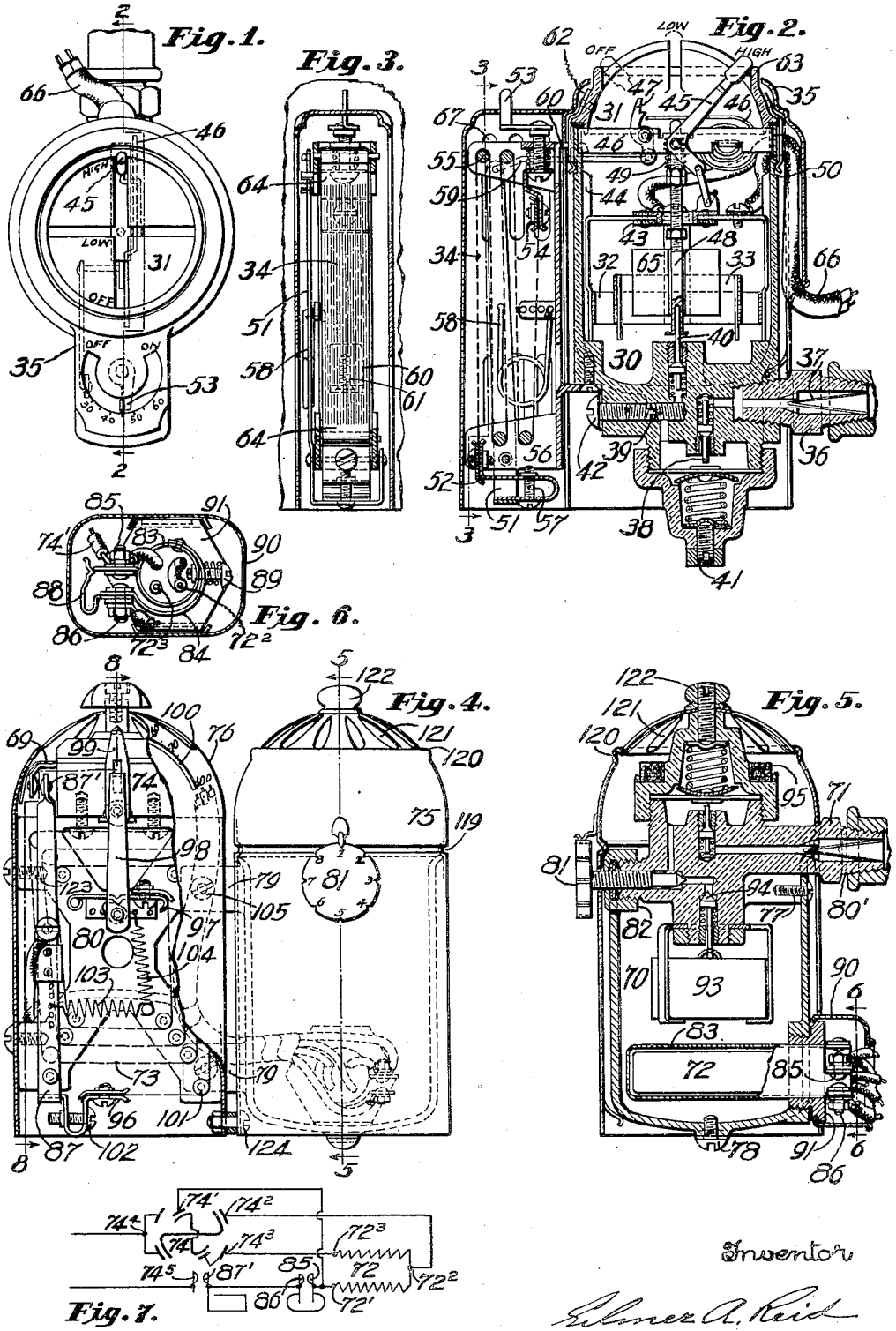

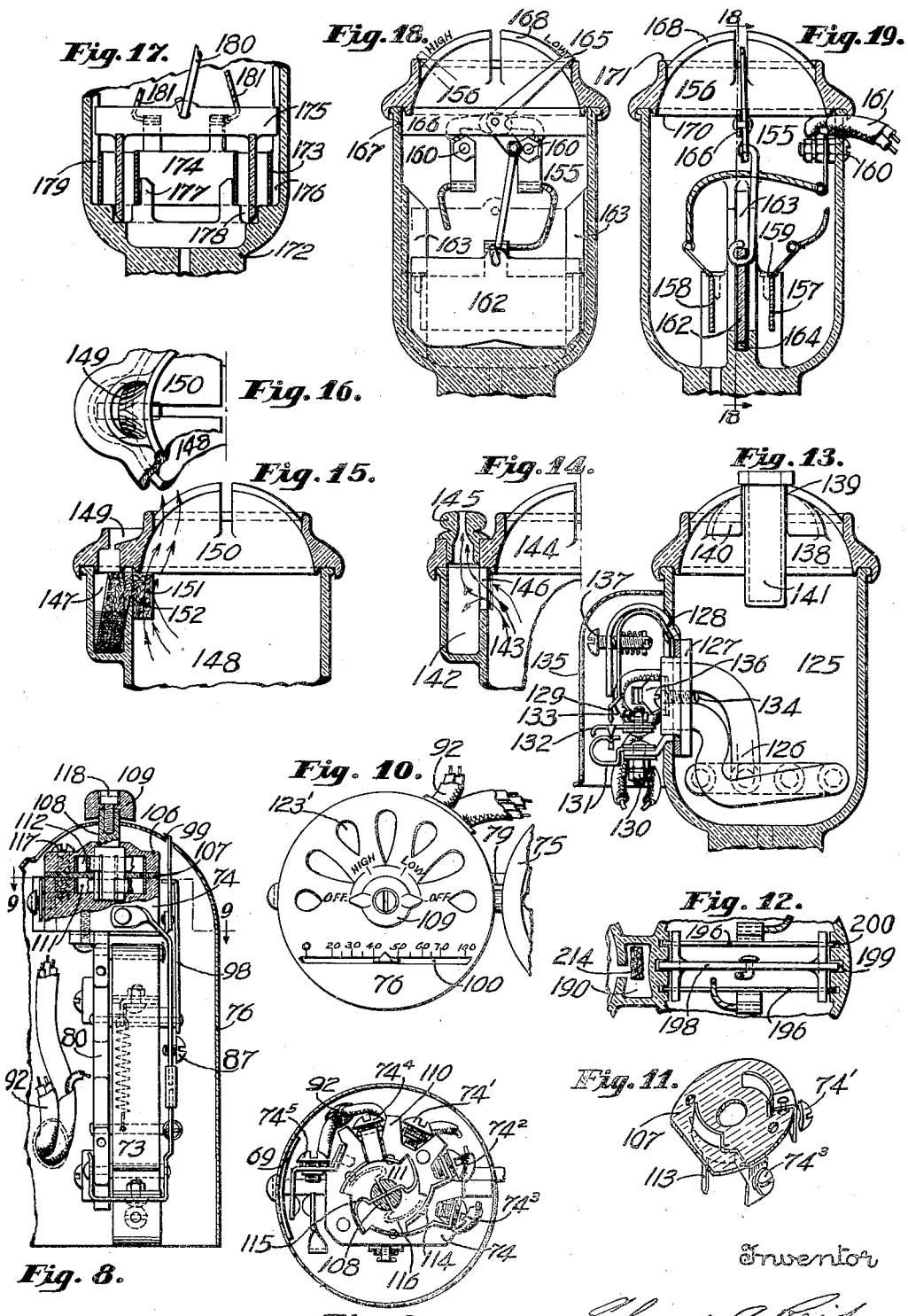

1,993,116

UNITED STATES PATENT OFFICE 1,993,116

AUTOMATIC ELECTRICAL HUMIDIFIER

Elmer A. Reid, Morrisville, Pa.

Application June 16, 1933, Serial No. 676,119

33 Claims. (Cl. 219—40)

This invention relates to improvements in electrical humidifiers of the type set forth in my patent application Number 625,572, filed July 29, 1932, in which a relatively small supply of liquid is automatically maintained and vaporized to the atmosphere continuously or intermittently. It relates more particularly to improvements in the general construction and in the automatically controlled operation thereof.

The objects of my improvement are: to provide for residential use an electrical humidifying unit which is compact, efficient and conveniently connected to an electric current and to water or steam pressure systems and the like and which is equipped with a humidistat for relative humidity regulation and control; to provide an automatic electrical humidifier with a hygroscopic element control of the volume of liquid admitted for evaporation; to provide an automatic electrical humidifier with a hygroscopic element and a multi-heat switch control of the flow of the electric current to the electric vaporizing unit; to provide an automatic electrical humidifier with an electric vaporizing unit equipped with a thermo-electric cut-out for interrupting the flow of the electric current when the liquid has evaporated below a pre-determined level to prevent excessive heating and rapid deterioration of the heating element; to provide an automatic electric humidifying unit equipped with an outer casing enclosing the unit in separate compartments and restricting heat radiation generated in the evaporating chamber; to improve the construction in sensitive hygroscopic elements whereby strands of hair or threads of fibrous material are held in permanently flatwise, parallel formation and whereby a relatively even tension and a permanent spacing of every strand is maintained to provide an automatic electrical humidifier with a metallic thermo-responsive element actuating a liquid valve automatically and intermittently; to provide an automatic electrical humidifier with an emersed, metallic thermo-responsive element in combination with a float for automatic intermittent operation of a liquid valve; to provide an efficient heat conducting member exposed to the hot vapors or the hot liquid in the evaporating chamber as a means for actuating a metallic, thermo-responsive element; to provide an electrical humidifying unit equipped with a hygrostat for relative humidity regulation and control in which a plurality of thermo-responsive elements coordinate in automatically actuating a liquid valve intermittently; to provide an electrical humidifying unit equipped with a hygrostat for relative humidity regulation and control in which a plurality of coordinating thermo-responsive elements automatically control the flow of electric current to the electric vaporizing unit; to provide a humidifier as a means for distributing to the atmosphere fragrant substances, ointments, disinfectants and the like; to provide for regulation in the transmission of the electric current between emersed electrodes by incorporating an electric resistance element between the electrodes and equipping either of them with means for adjustment with respect to each other; to provide an electrical humidifier adapted to receive liquid automatically and continuously or intermittently substantially in drops and equipped with a suitable electric vaporizing unit of the open or the closed resistor type effecting a distribution of the generated vapor to the atmosphere and affording protection from grounding by the use of the electric resistance members.

I attain these objects by mechanism illustrated in the accompanying drawings, in which:

Fig. 1 is a top view of one embodiment of the invention;

Fig. 2 is a vertical longitudinal sectional view thereof on the line 2—2 of Fig. 1;

Fig. 3 is a vertical sectional view on the line 3—3 of Fig. 2;

Fig. 4 is a front elevation showing a modified form of the invention;

Fig. 5 is a vertical sectional view thereof on the line 5—5 of Fig. 4.

Fig. 6 is a cross sectional end view on line 6—6 of Fig. 5 showing one form of thermo-electric cut-out on a heating unit;

Fig. 7 is a diagram of connections for the resistor type vaporizing unit;

Fig. 8 is a fragmentary cross sectional view on line 8—8 of Fig. 4.

Fig. 9 is a top view showing the multi-heat switch base on line 9—9 of Fig. 8;

Fig. 10 is a fragmentary top view of Fig. 4;

Fig. 11 is a perspective showing the upper stationary switch contacts and insulating washer;

Fig. 12 is a fragmentary cross section on line 12—12 showing the top view of electrodes in Fig. 20.

Fig. 13 is a vertical transverse section showing another form of heating unit equipped with a thermo-electric cut-out;

Fig. 14 is a vertical transverse section showing one method for distributing fragrant substances;

Fig. 15 is a vertical transverse section showing another method for distributing fragrant substances;

Fig. 16 is a fragmentary top view of Fig. 15;
Fig. 17 is partial vertical sectional view showing electrodes and an electric resistance element;
Fig. 18 is a vertical sectional view on line 18—18 of Fig. 19;
Fig. 19 is a vertical transverse sectional view showing another form of electrodes and electric resistance element;
Fig. 20 is a vertical longitudinal sectional view showing a modified form of the invention;
Fig. 21 is a fragmentary top view of Fig. 20 with the caps removed;
Fig. 22 is a vertical longitudinal sectional view showing a modified form of the invention;
Fig. 23 is a side elevation of a modified form of a thermo-responsive element;
Fig. 24 is a bottom view of Fig. 23;
Fig. 25 is a top view of Fig. 26 with the cap removed;
Fig. 26 is a vertical transverse sectional view showing a modified form of the invention;
Fig. 27 is a partial vertical sectional view showing a modified form of the invention.

Similar numerals refer to similar parts throughout the several views.

As illustrated in the drawings, Fig. 1, Fig. 2 and Fig. 3, the device comprises a receptacle 30 made of suitable, insulating material, a cap 31, preferably made of suitable, insulating material, adjustable electrodes 32 and 33, a humidistat equipped with a hygroscopic element 34 and an outer casing 35 partially enclosing the device.

The receptacle 30, as an integral part of its base, incorporates means for regulating the liquid supply in relatively small amounts. It is connected to a constant supply of liquid through a standard pipe-threaded fitting 36, preferably made of insulating material. The liquid passes into the receptacle through the strainer 37, the diaphragm pressure reducing valve 38, the internally adjusted regulator 39, and the admission valve 40. The liquid is admitted into the receptacle 30 substantially in drops.

The standard pipe-threaded fitting 36 also serves as a mounting for the device. The range of reduced pressures is obtained through the adjustment of screw 41. The internally adjusted regulator 39 is accessible by the removal of the outer screw plug and gasket 42. This removal also affords a check on the regulated liquid.

The cylindrical electrodes 32 and 33 are assembled in fixed relation to each other by means of the insulation fixture 43 and held in a vertical position by engaging the diametrically spaced vertical guides 44. Adjustment of the electrodes is effected through the movement of the pivoted, insulated arm and link 45 which connects with the insulating fixture 43 and extends through the slotted opening in cap 31. Moving the adjusting arm 45 into the off position interrupts the current. Movement into the low position causes slow evaporation through the lower restricted projections of the electrodes, and gradual movement into the high position increases the intermittent evaporation.

The frame 46, preferably of sheet metal, is assembled in narrow slots located diametrically opposite in the inside wall of receptacle 30. On this frame are mounted the adjusting arm 45, the thermo-responsive element 46, and the movable pawl 47. This frame also serves as an upper support for the center valve spindle 48 and the valve compensating spring 49. The partially threaded valve spindle 48 provides means for adjusting the compensating spring 49 and the float 65.

The cap 31 is secured to the receptacle 30 by means of fixed, depending projections 62 which spring into engagement with the recesses 50 in the outside wall of the receptacle 30. The cap is further provided with a raised portion 63 which circumscribes the base of the slotted openings in order to return the condensed vapor to the receptacle.

The sensitive hygroscopic element 34 responds to the degree of relative humidity in the atmosphere by elongating or contracting lengthwise. One end is secured to the pivoted arm 51 by means of a clamp and fixture 52. The other end is secured to the regulating arm 53 by means of clamp 54. This hygroscopic element is carried over upper and lower rollers 55 which are mounted in bearing frame 56. Screw 57 permits minute adjustment of the hygroscopic element. The compression spring 58 anchored in the bearing frame 56 and in the pivoted arm 51 maintains the tautness in the element.

Moving the regulating arm 53 to the degree of relative humidity desired raises or lowers the position of the clamp by means of the threaded bearing screw and the cam contact surfaces between the screw head and the clamp. The movement in turn reacts on the pawl 47 through connecting link 59 and the pivoted lever 51. The bearing frame 56 is supported by the receptacle 30 through the lugs 60 and the screw 61. This mounting provides for air space and for a partition between the frame and the receptacle.

The sensitive hygroscopic element 34 is of improved construction. It consists of strands which may be of fibrous material, or preferably of hair, spaced side by side in flatwise, parallel position with each strand held under relatively even tension. This condition is permanently maintained by embedding the strands in the bands 64 which consist of pliable, hygroscopic material, preferably cellophane with suitable adhesives or the like, and which are spaced at intervals throughout the length and at each end of the element. This condition may also be permanently maintained by contactively supporting the strands on crosswise strips which consist of pliable, hygroscopic material preferably cellophane with suitable adhesives or the like, and which are spaced at intervals throughout the length and at each end of the element. The bands or the strips further serve as a protection to the strands against wear and abrasion at points where the element is in contact with the rollers and clamps.

During the evaporating cycle the thermo-responsive element 46 absorbs heat from the rising vapors causing the free end to lift away from the valve spindle 48, thus permitting the admission valve 40 to close. The evaporation gradually ceases automatically whenever the liquid supply is shut off, causing the thermo-element to retract and reopen the admission valve 40. These alternations continue until the action of the hygroscopic element 34 causes the pawl 47 to move forward whereupon the thermo-element comes to rest upon the latch of the pawl and so prevents the re-opening of the admission valve 40. As a consequence the evaporation ceases and the relative humidity contracts the hygroscopic element, unlatches the pawl, and permits the thermo-element to again open the admission valve 40.

The center float 65 raises and lowers independently on valve spindle 48. Its function is to ensure the opening of the admission valve 40 in case the liquid supply is shut off or to close the valve in case the electric supply is shut off. The electrical connection between the electrodes 32 and 33 and the source of electrical supply is made through the electric wires 66.

The outer casing 35 consists of one compartment for the humidistat with a graduated opening to receive the regulating arm 53 and a second compartment for the evaporating receptacle with openings to receive the receptacle cap 31, the electric wires 66, and for other projecting members. It is constructed so that it will slide into position and practically enclose the unit. It is further provided with circulation openings 67 for the free passage of air across the hygroscopic element.

Combined with this relative humidity regulating humidistat is the on and off feature controlled by the regulating arm 53. Placing the regulating arm in the off position moves the pawl 47 to engage the thermo-element 46 shutting off operation. Moving the regulating arm to the on position removes the pawl from engaging the thermo-element and permits constant operation. The on or off movement more than off-sets the movement of the hygroscopic element due to the change in relative humidity.

As illustrated in the drawings Fig. 4 to Fig. 11 inclusive the device comprises a receptacle 70, preferably of metal a moulded regulating member 71, a resistor type vaporizing unit 72, a hygroscopic element 73, a multi-heat snap switch 74 and outer casings 75 and 76 partially enclosing the unit.

The receptacle 70 is supported by the regulating member 71 by means of screws 77 and is provided with threaded openings to receive the electric vaporizing unit 72 and the drain screw 78. It is further provided with side lugs 79 as a means of supporting the humidistat frame 80. The regulating member 71 is connected to a constant supply of liquid by means of the standard pipe-threaded extension 80—1. This extension also serves as the mounting for the device. The liquid which is regulated in relatively small amounts passes into the receptacle 70 through the regulating member 71. The cooperating elements embodied in the regulating member 71 are similar to those previously described. In this device the regulator 81 is adjusted externally and provided with a packing gland 82.

The enclosed resistance vaporizing unit transmits its heat through an efficient heat conducting member 83. This member has one end extended to support a thermo-responsive electric cutout 84. Also a fractional portion of the extension is formed to receive the mounting of an insulated electric contact 85. This contact 85 is electrically connected to coil 72 at point 72—1 and to the switch 74 at point 74—1.

The thermo-electric cut-out is correspondingly formed to receive the mounting of an insulated electric contact 86. This contact 86 is electrically connected to the pivoted insulated arm 87 on the humidistat. To this free end of the thermo-electric cut-out 84 is mounted a formed spring tension latch 88 which causes a snap make and break contact between 85 and 86. The thermo-electric cut-out mechanism is provided with a resilient cover 90 which is sprung into engagement with the coil bushing 91 when assembled in receptacle 70. When the liquid in the receptacle has evaporated below a predetermined level the thermo-electric cut-out 84 interrupts the flow of electric current to prevent excessive heating and rapid deterioration of the heating element.

The vaporizing unit 72 has point 72—2 electrically connected with the switch 74 at point 74—2. The vaporizing unit 72 has the point 72—3 electrically connected with the switch 74 at point 74—3. The device is connected to the source of electrical supply through electric wires 92 at points 74—4 and 74—5.

The float 93, suspended from the regulating member 71, actuates the admission valve 94 and maintains a predetermined level of liquid in the receptacle 70. The regulating member 71 is provided with a fibrous material washer 95. This washer, exposed to the hot vapors in the receptacle, is a means for vaporizing disinfectants, fragrant substances and the like. The sensitive hygroscopic element 73 responds to the degree of relative humidity in the atmosphere by elongating or contracting lengthwise. One end is secured to the pivoted, insulated arm 87 by means of a clamp fixture 96. The other end is secured to the pivoted clamp fixture 97. The fixture 97 engages the cam located on the pivoted, regulating arm 98. The regulating arm 98 is operated by engaging with the slotted auxiliary regulating arm 99. The auxiliary regulating arm 99 pivots from a center coinciding with the center of the radius describing the outer arc of the casing. The upper end of arm 99 is projected through the graduated, slotted opening 100 in the casing 76.

The hygroscopic element 73 is carried over rollers 101 which are mounted in frame 80. The screw 102 permits minute adjustment of the hygroscopic element. The compression spring 103 anchored to the frame 80 and to the pivoted, insulated arm 87 maintains the tautness in the element. The spring 104 anchored on the frame 80 and to the clamp fixture 97 maintains contact with the cam located on regulating arm 98. The frame 80 is assembled to the mounting lugs 79 by screws 105.

Moving the regulating arm 99 to the degree of relative humidity desired raises or lowers the position of the pivoted clamp fixture 97 by means of the cam action on arm 98. This movement in turn reacts on the pivoted, insulated arm 87 and opens or closes the electric contact 87—1 controlling the flow of current to the vaporizing unit 72. In this manner, with the regulating arm set for a desired relative humidity, the sensitive hygroscopic element variations automatically start or stop the humidifier and maintain a given relative humidity. The insulating shield 69 protects casing 76 from the electric contacts 87—1.

The multi-heat snap switch 74 is mounted on the upper part of frame 80 and is especially designed in the simplest form to occupy the minimum space in the dome of the casing 76. It comprises the insulating base 74, the insulating top plate 106, an upper and lower set of contacts spaced by the insulating disc 107 and an insulating rotating spindle 108 with a removable insulating turn knob 109.

The base is moulded of suitable insulating material. The irregular outside surface conforms to the requirements of the cooperating elements of the humidistat which constitutes a part of this control unit. The toothed corrugations 110 provide suitable guides for the switch terminals 74—1 and a protection against short circuiting. The switch is of improved construction embodying an upper and a lower set of contacts spaced by the insulating disc 107. The stationary contacts and terminals are suitably formed in one piece of metal and conform to the ratchet-like moulded cavities 111 and 112 in the base 74 and in the top plate 106 respectively. The lower stationary contacts are further provided with prongs 113 as an integral part thereof, forcefully engaging cavities 114 and holding the contacts securely in position. The upper stationary contact 74—1 is riveted to the insulating disc 107. The stationary contact 74—3 is a combination of upper and lower stationary contacts. The lower rotating contact 115 and the upper rotating contact 116 are suitably formed from one piece of metal, preferably spring bronze. The ends are formed to conform with the contour of the respective stationary contacts. The center portion of the rotating contacts are straight as illustrated in Fig. 9 and engage the transverse slots of the rotating spindle 108. The lower and upper rotating contacts 115 and 116 respectively are separated by the insulating disc 107.

The rotating center spindle 108 is made of suitable insulating material with transverse slots in which are mounted the lower and upper rotating contacts. This spindle is provided with a shoulder which engages the center recess of the insulating top plate 106. The lower end of the spindle engages a center recess in the insulating base 74 and is held in assembled position with the cooperating elements by means of the assembly screws 117. The upper part of the spindle 108 projects through the casing 76 to receive the insulating turn knob 109 and assembly screw 118. The insulating turn knob 109 is provided with two pointers diametrically spaced which indicate the high heat, low heat or the off position of the switch.

The casing 76, preferably of formed metal, encloses the top and sides of the humidistat and switch unit and is provided with perforations 123—1. It is further provided with the graduated slot 100 indicating the relative humidity. It has an upper opening to receive the switch spindle 108 and graduations indicating the high, low and off positions of the switch. The assembly is made by screws 123 and spacing bolt 124.

The casing 75, preferably of formed metal, encloses the top and sides of the evaporating unit and is provided with the interior projection 119, the exterior projection 120, and the upper perforations 121. The projections 119 and 120 serve to return the condensed vapors to receptacle 70. Through the perforations 121 the generated vapors are distributed to the atmosphere. Openings are also provided to receive the projecting members. The threaded locking knob 122 secures the casing in position.

Fig. 13 in modified form illustrates a resistance type evaporating unit and in modified form a thermo-electric cut-out. The sheathed heating coil 126 is equipped with a mounting flange 127. The heat transmitter 128 is suitably formed from efficient heat conducting metal, preferably aluminum, to support a thermo-responsive element 129. The lower portion of the heat transmitter 128 is suitably formed to receive the mounting of an insulated, electric contact 130. The pivotal spring bearing 131, preferably of strip spring bronze, is securely mounted on the lower portion of 128. The intermediate cooperating member 132 is pivotally in contact with the spring bearing 131 and the moving thermo-element 129. The insulated electrical contact 133 with a connection to the heating coil 126 is mounted in the moving member 132. As the thermo-element moves back and forth in the process of heating and cooling, the tension in the spring bearing 131 causes a snap make and break contact between 130 and 133. The unit is supported by receptacle 125 and secured by means of screws 134.

The cut-out mechanism is provided with cover 135, held in position by engaging with the side spring clips 136 which are anchored under mounting screws 134. The adjusting spring and screw 137 adjusts the thermo-element 129 for functioning at various specific temperatures.

Should the liquid in the receptacle evaporate below a predetermined level the thermo-electric cut-out would interrupt the flow of current to prevent excessive heating and rapid deterioration of the heating element. The current is supplied to the vaporizing unit through wires from contact 130 and coil 126. The liquid admission to the evaporating receptacle 125 is similar to that already described.

The vented cap 138 consisting preferably of moulded, insulating material is provided with an opening 139 and with supporting members 140 to receive a removable container 141. Fragrant substances in a liquid, a semi-liquid or a solid form may be supplied for vaporizing and for distributing to the atmosphere. The container 141 may also be designed with openings to expose its contents to the vapors of the evaporating receptacle.

Modified forms for distributing fragrant substances, ointments, disinfectants and the like to the atmosphere, are illustrated in Fig. 14, Fig. 15, and Fig. 16. The communicating container 142, Fig. 14 is a part of the evaporating receptacle 143 and the cap 144. The fragrant substances and the like may be supplied in any form by removing the vented cap 145. The vapors are generated and distributed to the atmosphere by exposing the contents to the vapors of the evaporating receptacle 143 through openings 146.

The communicating container 147, Fig. 15 is a part of the evaporating receptacle 148. The fragrant substances and the like may be supplied through the opening 149 in the vented receptacle cap 150. The fibrous material 151 is assembled in the container 147 and extended into the evaporating receptacle 148 through opening 152. The vapors are distributed to the atmosphere with the vapors from the evaporating receptacle 148 by exposing the saturated fibrous material 151 to the hot vapors of the receptacle.

Fig. 17, Fig. 18, and Fig. 19 in modified form illustrate electrode type evaporating units. The evaporating receptacle 155 consisting preferably of insulating material is supplied with a relatively small amount of liquid as previously described. The vented, resilient cap 156, consisting preferably of moulded, insulating material, is equipped with locking lugs of the type that spring into interlocking engagement with the receptacle. The spaced electrodes 157 and 158 are mounted in vertical slots in the insulating receptacle 155 and pinned into position by headed pins 159. The electrodes 157 and 158 are electrically connected to the terminal screws 160 supported by the receptacle 155. The terminal screws 160 are connected to the source of electrical supply through the electric wires 161. The electric resistance element 162 extends between the electrodes 157 and 158 engaging the vertical slots 163 and the bottom slot 164 in the receptacle. The lower edge of the resistance 162 is notched to permit wider range in regulating the transmission of current between the electrodes.

Adjustment of the electric resistance element 162 is effected through the movement of the pivoted adjusting arm and connector 165 which connects with the resistance element 162 and extends through the slotted opening in the cap 156. Moving the adjusting arm 165 into the low position lowers the resistance element 162 causing slow evaporation, and the gradual movement into the high position increases the rate of evaporation by reducing the resistance to the transmission of current through the liquid to the electrodes.

The adjusting arm 165 is pivoted to the frame 166. This frame is assembled in narrow slots 167 located diametrically opposite in the inside wall of receptacle 155.

The cap 156 is equipped with slotted openings 168 for emitting and distributing the vapors to the atmosphere. The depending interior flange 170 prevents the leakage of condensate or vapor between the cap and receptacle. The exterior projection 171 circumscribes the base of the cap openings as a means for returning the condensed vapor to the receptacle.

Evaporating receptacle 172, Fig. 17, in modified form, is equipped with spaced, cylindrical electrodes 173 and 174 and a cylindrical electrical resistance element 175. The electrodes 173 and 174 are held in position in the receptacle 172 by supporting bosses 176 and 177 respectively. The resisting element 175 extends between the electrodes and engages the lower circular recesses 178. The upper cross member of the resistance element 175 engages the vertical side grooves 179 and may be vertically adjusted by means of the adjusting arm connector 180. The electric leads 181 supply the current to the electrodes. The resistance to and the regulation of the transmission of current through the liquid to the electrodes may also be designed to embody a stationary electric resistance element and movable electrodes with adjusting means whereby the electrodes may be adjusted with respect to the resistance eleement for evaporation regulation and for interruption of the electric current.

As illustrated in Fig. 20, Fig. 21 and Fig. 12 the device comprises the evaporating receptacle 185 and the float receptacle 186 provided with caps 187 and 188 respectively and supported on the insulating communicating base 189. The receptacles 185 and 186 are moulded in one piece of suitable, insulating material and provided with an auxiliary chamber 190 communicating with the receptacle 186. The caps 187 and 188 are preferably made of resilient, insulating material with integral dugs of the type that spring into interlocking engagement with the receptacle. They embody the slotted openings and the retaining projections previously described. The supporting insulating base 189 is connected to a source of liquid supply through the standard pipe-threaded connection 191. This connection also serves as the mounting for the device.

The supporting base 189 embodies the regulating means previously described whereby the liquid is admitted into the float receptacle in relatively small amounts transmitting the liquid from the float receptacle 186 through discharge valve 192 and passage 193 to the evaporating receptacle 185. Locking nuts 194 and 195 secure the receptacles to the supporting base with gaskets. The adjustable electrodes 196, in modified form, embody the pivoted adjusting arm and connector 197 and the insulating yoke 198. The insulating yoke 198 engages the vertical slots 199 diametrically spaced in receptacle 185.

Fig. 12 shows a top view of these electrodes. The adjustable electrodes 196 are assembled in the receptacle in fixed relation to each other through the combined supporting members of the insulating yoke 198 and the vertical slots 200. The bottom projections 201 on the electrodes 196 furnish a greater range in evaporation regulation. The electric leads 202 connect the electrodes 196 with the electric terminals 203. The electric terminals 203 are supported by the receptacle and connected to the source of electrical supply.

A hydrostat for automatically controlling the relative humidity through the admission of liquid to the evaporating receptacle is mounted on the bearing frame 208 in the upper part of the float receptacle 186. It consists of wet and dry thermo-responsive element 204 and 205, the movable differential arm 206 which is pivoted to the movable end of the thermo-responsive element 204 and which engages the slotted end of the element 205 and the pivoted latch 207 with the lower slotted end of 206.

The regulating arm 209 which extends through the graduated slotted opening in cap 188 is pivoted on the frame 208 and effects a regulation of the relative humidity by adjusting the wet thermo-element 204 with respect to the dry thermo-element 205 by means of a cam action on the adjustable mounting member 210. The thermo-responsive element 211 is mounted on frame 212 which is assembled in the evaporating receptacle 185. This thermo-element 211 extends into the float receptacle 186 and automatically opens and closes the discharge valve 192 by actuating the valve spindle 213. The upper end of the valve spindle 213 is supported by the frame 208 and is equipped with the adjustable compensating spring 217.

The saturated fibrous material member 214 assembled in the auxilary chamber 190 has its lower end emersed and its upper end coiled into the thermo-element 204. The tension on the thermo-element 211 is adjusted through the adjusting screw 215 to coordinate with the wet and dry thermo-elements 204 and 205. The perforations 216 in receptacle 186 permit the circulation of air around the thermo-elements.

The float 217 is provided with a center hole and is freely mounted on the valve spindle 213. It maintains a constant supply of liquid in the float receptacle 186 by contacting the hinged lever 218, thereby opening the admission valve and admitting liquid.

Moving the regulating arm 209 to the relative humidity desired adjusts the wet thermo-element 204 with respect to the movable end of the dry thermo-element 205. As the desired relative humidity is approached the movable ends of both thermo-elements 204 and 205 approach a horizontal plane moving the lower end of the differential arm 206 toward a vertical position and this movement carries the pivoted latch 207 into the path of the cooperating thermo-element 211. In operation the free end of this cooperating thermo-element is raised due to the heat it absorbs from the hot vapors of the evaporating receptacle. This allows the discharge valve 192 to close. The discharge valve remains closed until evaporation ceases and the thermo-element 211 begins to cool.

In cooling the thermo-element again contacts with the valve spindle 213 and reopens the discharge valve 192 thus repeating the evaporating cycle. This function is repeated until the hinged latch moving into the path of the thermo-element 211 prevents the lowering of the element. Under this condition the discharge valve 192 remains closed and evaporation stops. As the relative humidity drops the differential arm 206 is redrawn from its relatively vertical position removing the latch 207 and causing the reopening of the discharge liquid valve 192, and a resumption of evaporation. The slot in the lower end of the differential arm 206 compensates for changes in temperature.

Moving the regulating arm 209 to the on full position causes continuous evaporation and a movement into the off position shuts off evaporation. Moving the adjusting arm 197 which extends through the graduated slotted openings in cap 187 to the off position interrupts the current and stops evaporation. Movement into the low position causes slow evaporation through the lower, restricted projections of the electrodes, and movement toward the high position increases the rate of evaporation.

Fig. 22 in modified construction combines in one piece the evaporating receptacle 220, the float receptacle 221 incorporating as an integral part thereof the supporting base 223, and the auxiliary chamber 222 with communicating means 224 through the partition wall. The base of the evaporating receptacle 220 supports an electric snap switch 225 which is connected to an evaporating unit equipped with an exposed type resistance heating element 226. The receptacle unit is moulded in insulating material and is supported and connected to the source of liquid supply through base 223 as illustrated in Fig. 26. The liquid is admitted substantially in drops and is controlled by means of the center hole float 227 actuating the admission valve 228 through the hinged lever 229. The center screw 230 guides the float and holds the hinge of lever 229.

A hygrostat for automatically controlling the relative humidity through the flow of the electric current to the evaporating unit is mounted on the bearing frame 231 in the upper part of the float receptacle 221. It consists of wet and dry thermo-responsive elements 232 and 233 respectively. The differential fixture 234 with an insulated electrical connection from the heating element through the leads 237 makes contact with the cooperating thermo-electric element 235. The circuit is completed through the thermo-electric element 235 which is supported on an electrically insulated mounting on the bearing frame 231 and through the efficient heat conducting member 236 to the snap switch 225. The snap switch 225 is connected to the source of electric current through wires 238. The differential fixture 234 is pivoted to the movable end of the wet thermo-element 232 and engages the movable slotted end of the dry element 233.

The saturated fibrous material 239 immersed in the auxiliary chamber 222 has its upper end coiled into the thermo-element 232. The regulating arm 240 which extends through the slotted openings in the cap 242 is pivoted on the frame 231 and effects a regulation of the relative humidity by adjusting the wet thermo-element 232 with respect to the dry thermo-element 233 by means of a cam action on the adjustable mounting member 241.

Moving the regulating arm 240 to the relative humidity desired adjusts the movable pivotal end of the wet thermo-element 232 with respect to the movable pivotal end of the dry thermo-element 233. As the desired relative humidity is approached, the movable, pivotal ends of both thermo-elements under spring tension, pass through the point of equilibrium causing a quick break between contacts of the differential fixture 234 and the cooperating thermo-electric element 235. As the moving pivotal ends of the thermo-elements pass back and forth through the point of equilibrium in the process of varying the relative humidity, the pivotal points, under spring tension, cause a quick make and break of the electric circuit. The elongated contact 235 compensates for changes in the temperature.

226, the exposed heating element of the evaporating unit, is assembled in corrugations in the refractory porcelain plate 243 and through mounting bolts is electrically connected to the switch 225 and the lead 237. An efficient heat conducting plate 244, preferably of aluminum, is an extension of the aluminum electric lead 236 and is assembled in contact with the raised section extending across the diameter of the refractory member 243. The mounting bolt 245 connects the lead 236 with the switch. The heat conducting plate 244 provides means for automatic interruption of the electric current when the liquid in the receptacle 220 has evaporated away. The excessive heat absorbed by the plate 244 is transmitted to the thermo-electric cut-out 235 interrupting the circuit.

The electric switch 225 is designed for compactness, simplicity and minimum parts. Suitably formed in one piece it comprises the lead terminals with stationary switch contacts 246 and angular members for assembling under the mounting bolts. The moving contacts 247 are suitably formed in one piece to pivot in the apex of the base opening and to support a spring with a cup washer 248. The insulating pivoted handle 249 travels to a given angle under spring tension causing the moving blades 247 to snap into contact with the stationary blades 246. The spring and washer travel along the inside edge of the handle to the opposite end. Reversing the handle in the off position disengages the switch contacts and shuts off the current. Also, an electric switch can be designed as a separate cooperating member and can be mounted on the receptacle.

The caps 242 and 250, preferably moulded of insulating material, are equipped with the type of interlocking lugs, slotted openings and condensate return projections as previously described. In addition the cap 250 is equipped with an inner depending deflector 251 shielding the air inlets 252 in receptacle 220. Providing these separate passages for the incoming air accelerates the escape of the rising vapors during low evaporation operations.

As a means for distributing the vapors from fragrant substances, ointments, disinfectants and the like to the atmosphere the cap 250 is further provided with the auxiliary container 253 and the vented auxiliary cap 254 in modified form. These fragrant substances and the like are supplied to the container 253 and are vaporized by exposing the container to the hot vapors of the receptacle. The fragrant vapors are distributed to the atmosphere with the rising vapors from the receptacle.

The partitioned opening 224 between receptacles is an extension of the opening provided for the drain screw and gasket 255. Also the partition opening may be designed with means for regulating the liquid between the receptacles.

Figs. 23 and 24 in modified form combine an efficient heat conducting member exposed to the hot vapors of the evaporating receptacle with a metallic thermo-responsive element as a means for operating a liquid valve in the float receptacle.

The frame 258 supports the efficient heat conducting member 259, preferably of aluminum, which is equipped with the metallic thermo-responsive element 260. This thermo-element opens and closes a liquid valve through the valve spindle 261. The valve spindle 261 has the upper end supported through the opening in member 259 and is equipped with the compensating spring 262. The heat conducting member 259 is adjusted through the regulating arm which is pivoted on the frame 258. The end spring 264 maintains contact with the regulating arm eccentric 263. Adjustment of the thermo-element 260 is obtained by the adjusting screw 265.

Moving the regulating arm 263 to the on full position holds the liquid valve open for continuous evaporation. Movement to the off position holds the liquid valve closed and stops operation. The intermediate, graduated positions govern the frequency of intermittent evaporation. The frame 258 is supported in the double receptacle combination previously described.

As illustrated in the drawings Fig. 25 and Fig. 26, the device comprises simplification in construction in automatic humidifiers. The receptacle 266, preferably of moulded, insulating material, incorporates as an integral part of the base 267 as previously described, regulating means through which the supply of liquid is admitted into the receptacle substantially in drops. The standard pipe-threaded fitting 268 as previously described, made preferably of moulded, insulating material, connects with the source of liquid supply 269. This connection also serves as a mounting for the device. The moulded, resilient cap 270 is equipped with integral lugs of the type that spring into interlocking engagement with the receptacle and with the slotted openings and the condensate return protrusion previously described.

The spaced electrodes 271 and 272, preferably of stainless steel, are suitably formed and engage the side slots in the receptacle 266 and are secured in place with pins 273. The electrodes are connected to the terminals 274 by the leads 275. The terminals 274 are supported by the receptacle 266 and are connected to the source of electric supply through wires 276. The stationary frame 277 is mounted in the inside slots spaced opposite in the upper part of the receptacle 266. The frame 277 supports the adjustable frame 278, the pivoted, regulating arm 279, and the adjustable frame spring 280.

The metallic thermo-responsive element 281 mounted on the adjustable frame 278 contacts with the valve spindle 281—1 to open and close the liquid valve 282. The valve spindle 281—1 has the upper end supported through an opening in the adjustable frame 278 and is equipped with the compensating spring 283. The partly threaded valve spindle provides means for adjusting the compensating spring 283 and the float 284. Also the spaced electrodes 271 and 272 can be supported from the electric terminals 274 mounted on the receptacle 266 and suspended through leads 275.

The float 284 has a center hole and is freely mounted on the valve spindle 281—1. Its function is to ensure the closing of the liquid valve 282 in case the electric current is shut off or the opening of the valve in case the liquid supply is shut off.

Regulation of the device is effected through the regulating arm 279 which extends through the graduated, slotted opening in the cap 270. Regulation as previously described under Fig. 23 ranges from shut off through increasing frequencies of intermittent operation to full continuous operation.

Fig. 27 embodies modifications for automatic control of intermittent or continuous admission of liquid for evaporation. The receptacle 285 incorporates means previously described for connecting with a source of liquid supply and for regulating the supply which is admitted to the receptacle through the admission valve 286.

The emersed thermo-responsive element 287 is mounted on the hinged, lever arm of the hinge 288. This lever contacts with the admission valve 286. The float 289 has a center hole and is freely mounted on the stud 290. The lower end of the stud secures the hinge 288 and the lock nuts on the upper end adjust the float travel.

The spaced electrodes 291 are mounted in the insulating, movable yoke 292 and are provided with tapered, lower edges for the more gradual introduction into the liquid. The movable yoke 292 engages the vertical slots 293, spaced opposite in the receptacle 285, and connects with suitable, regulating means for adjusting the electrodes and evaporation. The electrodes 291 are connected with the electric current through lead wires 294. In operation the float 289 contacts with the thermo-element 287 opening the admission valve 286 and admitting liquid to a pre-determined level. During the evaporation period the free end of the thermo-element lowers from the float. When the evaporation ceases the cooling liquid raises the thermo-element to re-contact with the float admitting more liquid and repeating the evaporation cycle.

Through adjustable electrodes the electric current can be interrupted or the automatic operations regulated for intermittent or continuous evaporation. Also, the automatic control for admission of liquid for evaporation can be designed with the thermo-elements above the liquid level in contact with the upper part of the float employing the stationary or the adjustable electrical vaporizing unit.

While I have described my invention with respect to the particular embodiments it is to be understood that changes in detail may be made without departing from the scope of the appended claims.

I claim:

1. In combination with a humidistat as a means for providing automatic relative humidity regulation through control of the liquid supplied for evaporation an electrical humidifier comprising an evaporating receptacle into which a relatively small amount of liquid is regulatively supplied, an electric vaporizing unit positioned in said receptacle and suitable terminals for connection with an electric circuit, interposed regulating means mountably connected with a water or steam pressure system, a cover provided with an opening or openings affording the free emission of vapors, an outer casing restricting the heat radiation of said receptacle, a sensitive hygroscopically responsive element subjected to the atmosphere and regulatively mounted on a frame with means for mounting said frame on said receptacle, and cooperative means including means for transmitting the elongations or the contractions of said hygroscopically responsive element for controlling the liquid supplied for evaporation.

2. In combination with a humidistat as a means for providing automatic relative humidity regulation through control of the electric current to the electric vaporizing unit an electrical humidifier comprising an evaporating receptacle into which a relatively small amount of liquid is regulatively supplied, an electric vaporizing unit positioned in said receptacle and including an interposed high and low heat electric switch connecting said vaporizing unit with an electric circuit, interposed regulating means mountably connected with a water or steam pressure system, an outer perforated casing affording the free emission of vapors and restricting the heat radiation of said receptacle, a sensitive hygroscopically responsive element subjected to the atmosphere and regulatively mounted on a frame with means for mounting said frame adjacently on said humidifier, an adjacent outer perforated casing with openings to receive regulating members of said elements and means for transmitting the elongations or the contractions of said hygroscopically responsive element effecting the interruption or the resumption of the electric current to said vaporizing unit.

3. In combination with a humidistat as a means for providing automatic relative humidity regulation through control of the electric current to the electric vaporizing unit an electric humidifier comprising an evaporating receptacle into which a small amount of liquid is regulatively supplied, an electric vaporizing unit positioned in said receptacle and connected with an electric circuit including an electric switch and a humidistat interposed in said electric circuit, a sensitive hygroscopically responsive element subjected to the atmosphere and regulatively mounted on a supporting frame, means for automatically controlling the evaporation cycles in said evaporating receptacle through the elongating or the contracting responsives in said moisture responsive element and through effecting interruption or resumption of the electric current to said vaporizing unit and interposed regulating means mountably connected with a water or steam pressure system for regulatively supplying a small amount of liquid continuously or intermittently for evaporation to the atmosphere.

4. In combination with a hygrostat as a means for providing automatic relative humidity regulation through control of the liquid supplied for evaporation an electrical humidifier comprising a float receptacle with a slotted cover into which receptacle a small amount of liquid is automatically admitted and supplied to an adjacent communicating evaporating receptacle having a slotted cover, an electric vaporizing unit positioned in said receptacle and suitable terminals for connection with an electric circuit, a base with regulative means mountably connected with a source of liquid supply, an emersed saturated element of fibrous material contacting with one of a plurality of coordinating bimetallic thermo-responsive elements including a wet and dry element subjected to the atmosphere, means for regulatively mounting said responsive elements in said receptacles, a co-related differential heat resisting element compensatively adapted for temperature changes and operatively connected to the movable ends of wet and dry elements, and cooperative means for transmitting thermo-responsives of said wet and dry elements and of a thermo-responsive element which is subjected to the hot vapors or to the hot liquids of said evaporating receptacles for controlling liquid supplied for evaporation.

5. In combination with a hygrostat as a means for providing automatic relative humidity regulation through control of the electric current to the electric vaporizing unit an electrical humidifier comprising a float receptacle with vented cover into which receptacle a small amount of liquid is automatically admitted and supplied to an adjacent communicating vaporizing receptacle with vented cover, an electric vaporizing unit positioned in said receptacle and an interposed electric switch connected with an electric circuit, interposed regulating means mountably connected with the source of liquid supply, an emersed saturated element of fibrous material contacting with one of a plurality of coordinating bimetallic thermo-responsive elements including a wet and a dry element subjected to the atmosphere, means for regulatively mounting said responsive elements in said receptacles, a co-related differential heat resisting element compensatively adapted for temperature changes and operatively connected to the movable ends of said wet and dry elements and cooperative means including means for transmitting the differentiating thermo-responsives of the wet and dry elements for effecting the interruption and the resumption of the electric current to the vaporizing unit.

6. In combination with a thermo-responsive element as a means for providing regulated operation through control of the liquid supplied for evaporation, an electrical humidifier comprising a receptacle into which a small amount of liquid is regulatively supplied, an electric vaporizing unit positioned in said receptacle and including suitable terminals for connection with an electric circuit, interposed regulating means mountably connected with a water or a steam pressure system, a cover provided with an opening or openings affording the free emission of vapors, a bi-metallic thermo-responsive element or elements subjected to the hot vapors or to the hot liquid of said receptacle, means for adjustably mounting said responsive element in said receptacle and regulative means including means for transmitting the thermo-responsives of the thermo-element for controlling the liquid supplied for evaporation.

7. In combination with a thermo-responsive element as a means for providing regulated operation through control of electric current to the electric vaporizing unit an electrical humidifier comprising a receptacle into which a small amount of liquid is regulatively supplied, an electric vaporizing unit positioned in said receptacle and including an interposed electric switch connected with an electric circuit, interposed regulating means mountably connected with a water or a steam pressure system, a cover provided with an opening or openings affording the free emission of vapors, a bimetallic thermo-responsive element or elements subjected to the hot vapors or to the hot liquid of said receptacle, and regulative means including means for transmitting the thermo-responsive of the thermo-element effecting the interruption or the resumption of the electric current to the evaporating unit.

8. In combination with a thermo-responsive element as a means for providing regulated operations through control of the liquid supplied for evaporation an electrical humidifier comprising a float receptacle into which a small amount of liquid is automatically admitted and supplied to the adjoining communicating evaporating receptacle, an electric vaporizing unit positioned in said receptacle, an interposed switch supported by said humidifier for connection with an electric circuit, a base with regulative means mountably connected with a water or a steam pressure system, covers for said receptacles provided with an opening or openings affording the free emission of vapors from said evaporating receptacle, an efficient heat conducting element supporting a cooperating bimetallic thermo-responsive element subjected to the hot vapors or to the hot liquid of said evaporating receptacle, means for adjustably mounting said cooperating elements in said receptacles with the movable end extended into the communicating float receptacle and regulative means including means for transmitting the thermo-responsives of the thermo-element for controlling the liquid supplied for evaporation.

9. In combination with a humidifier of the class described a humidistat comprising a sensitive hygroscopically responsive element subjected to the atmosphere with means for mounting said responsive element on a supporting frame, one end of said element being connected with a rotatable regulating fixture and the other end being operatively connected with an adjustable spring-tensioned pivoted lever, said lever effecting control of the liquid valve mechanism, a frame supporting said cooperating elements with means for mounting on said receptacle and thermo-responsive cooperating means including means for transmitting the elongations and the contractions of said hygroscopically responsive elements for controlling evaporation.

10. In an electrical humidifier and a humidistat of the class described an outer casing providing a separate compartment for said humidistat with graduated opening to receive the regulating member and with circulation perforations, providing a second compartment for the evaporating receptacle of said humidifier with openings to expose the vented portion of said receptacle cap and with openings to receive projecting members, and providing said casing with mountable means to provide an air space to restrict heat radiation from said evaporating receptacle.

11. In combination with a humidistat as means for providing relative humidity regulation through hygroscopic elements an electrical humidifier comprising a moulded insulating receptacle having integral means for regulating the liquid supplied for evaporation, having mountable means for connecting said receptacle with a water or a steam pressure system, having vertically positioned cylindrical electrodes supplied with electric current and provided with insulating means for assembling in spaced relation with respect to each other and provided with regulative means for positioning upward or downward to effect interruption with said liquid supply and with the electric current, said regulative means effecting slow evaporation by emersing the lower projection of said electrodes and increasing evaporation by lowering said electrodes into said liquid, having cooperative elements supported in said receptacle including a bimetallic thermo-responsive element subjected to the hot vapors, and having the hygroscopically controlled elements of said humidistat engaging the movable end of the thermo-element in said receptacle and regulatively actuating a spring-tensioned valve and valve spindle to control the liquid supplied for evaporation.

12. In an electrical humidifier of the class described a receptacle adapted to receive a cap made of moulded insulating material with one or more openings in combination with a raised band or with a depressed cavity circumscribing said openings or opening as means for preventing the escape of condensed vapors and with outlet means for draining said condensate into the receptacle, and interlocking lugs mounted in position on said cap or on said receptacle adapted to be sprung into interlocking engagement with said receptacle or with said cap, said receptacle or cap having an opening or openings separated from the vapor discharge openings for admitting and directing air to accelerate emission of vapors.

13. In an electrical humidifier of the class described corrosion resisting electrodes made of stainless steel insulatively assembled in spaced relation with respect to each other provided with suitable means for connection with an electric circuit and provided with a lower projected portion or portions as a means for gradual restricted introduction of the electrodes into the liquid transmitting the electric current, and an electrically insulated connection between the humidifier and the liquid supply system comprising an engaging connecting fitting made of suitable insulating material or an insulating support extension with engaging connecting means to form an insulating mounting.

14. In combination with an electrical humidifier of the class described an adjacently mounted humidistat comprising a sensitive hygroscopically responsive element made of a strip of hygroscopic flexible cellophane subjected to the atmosphere with means for mounting said responsive element on a supporting frame, one end of said element being connected to a pivoted regulating fixture in contact with an eccentric regulating arm which in turn is actuated by a pivoted auxiliary arm, the other end of said responsive element being operatively connected with the adjustable spring-tensioned pivoted lever, an electric contact mounted on the insulated portion of said lever with means for connecting with an electric circuit, a frame supporting said cooperating elements with means for adjacently mounting with said humidifier, an electric switch mounted on said frame with means for electrically connecting a resistance coil vaporizing unit with an electric circuit to provide high and low heat regulation and shut-off, means for automatic relative humidity regulation through interruption or resumption of the electric current to the vaporizing unit, and an outer dome shaped casing mounted on said frame with perforated air circulation means and with graduated openings to receive the regulating members of said switch and humidistat.

15. In combination with a humidistat as a means for providing relative humidity regulation through control of the electric current to the electric vaporizing unit a high and low heat electric switch comprising a mountable insulating base, an insulating top plate separated by means of an intermediate disc, stationary arc-like contacts with electric terminals and mounting prongs suitably formed in one piece, upper and lower arc-like rotatable contacts separated by said insulating discs, said contacts suitably formed in one piece to engage end openings of an insulating rotatable shouldered spindle, means for providing perpendicular engagement of said spindle assembled in the central recesses and the openings in said base top plate and disc, a two point indicating removable turn knob secured by threaded means to the extension of said spindle, and means for interruption and resumption of the electric current to said vaporizing unit through cooperative elements in said switch and said humidistat.

16. In combination with a humidistat as a means for providing automatic relative humidity regulation an electrical humidifier comprising a receptacle, a supporting member and an outer casing, said receptacle containing a small amount of regulatively supplied liquid which is evaporated by means of an enclosed resistance type electric vaporizing unit secured in said receptacle by means of a threaded fixture and which transmits heat to said liquid through efficient heat conducting material with means for externally extending said heat conducting material and providing means for supporting and actuating a thermo-responsive electric cut-out electrically connected in circuit with said vaporizing unit, with means for interrupting said circuit to prevent excessive heating of said unit, with adjustable means for current interruptions at predetermined temperatures, with slidable spring-tensioned means to effect quick make and break electric contacts and with a cover adapted to be sprung into interlocking engagement with said threaded fixture, said supporting member incorporating regulative means and supporting said receptacle mountably connected with a source of liquid supply, the regulative means including an externally adjustable regulating valve and supplying liquid in relatively small amounts to said receptacle with means for automatically shutting off the liquid at pre-determined levels, and said outer casing being dome-shaped and perforated with an outer projection forming a recess circumscribing the base of said perforations with an interior drainage projection and with an air space surrounding said receptacle as a means to restrict heat radiation.

17. In an electrical humidifier of the class described comprising an evaporating receptacle in which a small amount of liquid is regulatively supplied, an enclosed resistance type electric vaporizing unit, supplied with electric current, securely positioned in said receptacle by cooperating flange elements, having means for transmitting heat to said liquid through efficient heat conducting material, having means for transmitting heat and for supporting a thermo-responsive element, having a suitably formed efficient heat conducting member actuating a thermo-responsive cut-out electrically connected in circuit with said vaporizing unit, having means for interrupting the current regulatively preventing excessive heating of said unit, having adjustable means for current interruptions at predetermined temperatures, having means actuating a fulcrum back and forth through the point of equilibrium of a spring-tensioned pivotal bearing for effecting quick make and break electric contacts, and having a cover engaging interlocking reflexing elements secured to said unit.

18. In combination with a hygrostat as means for providing automatic relative humidity regulation through control of the liquid supplied for evaporation an electrical humidifier comprising a combination float receptacle and an evaporating receptacle with vented interlocking caps and a communicating supporting base, said combination receptacle made of insulating material including an auxiliary communicating chamber containing an emersed saturated fibrous material contacting with one of a plurality of cooperating bimetallic thermo-responsive elements, mountable means for one dry cooperating element and regulatively mountable means for one wet operating element with means for pivotally connecting a movable co-related heat resisting differential element with the movable ends of said dry and wet elements, the said differential element being provided with compensating means for changes in temperature and with means for intermittently engaging the movable end of a thermo-responsive element subjected to the hot vapors or the hot liquid of said evaporating receptacle and extended to actuate a liquid discharge valve, regulative means supported in said float receptacle and extended through said cap providing adjustment of said wet and dry elements with respect to each other, and cooperative means transmitting the regulative responsives of said thermo-elements for controlling the liquid supplied to said evaporating receptacle.

19. In combination with a hygrostat as means for providing automatic relative humidity regulation through control of electric current to the electric vaporizing unit an electrical humidifier comprising a communicating combination float receptacle and an evaporating receptacle made of insulating material with vented caps, the insulating float receptacle having air circulation openings, having integral regulating means, being mountably connected with a source of liquid supply, and being provided with a regulated supply of liquid automatically admitted and supplied to said evaporating receptacle, having an emersed saturated fibrous material contacting with one of a plurality of cooperating bimetallic thermo-responsive elements with mountable means for supporting said thermo-responsive elements including one wet and dry element in said float receptacle, having regulative means supported in said receptacle and extended through said cap providing adjustment of said wet and dry elements with respect to each other with means for pivotally connecting a spring-tensioned insulating differential element including an electrically connected contact with the movable ends of said wet and dry elements, having an electrically connected thermo-responsive element provided with an electric contact insulatively mounted in said float receptacle and extended into said evaporating receptacle, said contacting differential element providing compensating means for changes in temperature for effecting the interruption and the resumption of the electric current to the vaporizing unit and for providing a quick make and break electric contact between said differential element and said contact thermo-element.

20. An electrical humidifier comprising a combination float receptacle and an evaporating receptacle with vented interlocking caps and a communicating supporting insulating base as recited in claim 19, said evaporating receptacle having insulation means for laterally assembling adjustable electrodes engaging vertical supporting members, having adjusting insulated means supported in said receptacle and connected with said electrode assembly interrupting the electric current through said adjustment or regulative positioning of said electrodes for high or low evaporation, having electric terminals supported to connect said electrodes with an electric circuit, having means for supporting an adjustable thermo-responsive element subjected to hot vapors of said evaporating receptacle and extended into the communicating float receptacle, said base having means for supporting said receptacle combination, being mountably connected with a source of liquid supply, being provided with means for regulating the flow of liquid automatically admitted into said float receptacle, being further provided with means for communicating the discharged supply to said evaporating receptacle, including checking means for said regulated supply and including means for draining said liquid from said receptacle.

21. An electrical humidifier comprising a communicating combination float receptacle and an evaporating receptacle with vented interlocking caps as recited in claim 20, said insulating evaporating receptacle having a small amount of liquid automatically supplied for evaporation through communicating means with said float receptacle, having an integral electric switch with a V-shaped cavity for receiving a movable spring-tensioned switch contacting mechanism pivoting in the apex of said cavity and slidably engaging an oscillating insulating handle, said switch base being provided with stationary switch contacts and terminals suitably formed in one piece connecting with an electric circuit and with a mountable insulating cover receiving said insulating handle and interlocking with said base, having an exposed resistance type electric vaporizing unit in combination with a suitable non-conducting heat-resisting supporting element with means for mounting in said receptacle for connecting with an electric circuit and with a hygrostat switch, having an efficient electrically connected heat conducting element transmitting heat from said vaporizing unit to a thermo-responsive hygrostat electric contact as means for interrupting the current when the liquid supply is shut off, and having means for checking said regulated liquid supply and for draining said liquid from said receptacle, said receptacle or cap having an opening or openings separated from the vapor discharge openings for admitting and directing air to accelerate emission of vapors.

22. In combination with a thermo-responsive element as a means for providing automatic regulative operation an electrical humidifier comprising a receptacle made of insulating material having integral regulating means and means for engaging a connector for mountably connecting said receptacle with a source of liquid supply, having means for automatically admitting small amounts of said regulated supply continuously or intermittently, having spaced electrodes positioned in said receptacle and connected with an electric circuit through terminals supported by said receptacle, having an interlocking cap provided with openings for the free emission of vapors with a raised band circumscribing the base of said openings, having a bimetallic thermo-responsive element subjected to the hot vapors or to the hot liquid of said receptacle, having means for mounting said responsive element in said receptacle and having regulating means including means for transmitting the thermo-responses of said thermo-element for controlling the evaporation cycle.

23. In combination with a thermo-responsive element and a float as a means for providing automatic regulative operation an electrical humidifier comprising a vented cap, a receptacle made of insulating material with integral regulating means, means for engaging a connector for mountably connecting said receptacle with a source of liquid supply, means for automatically admitting small amounts of said regulated supply continuously or intermittently, insulating means for assembling adjustable electrodes in spaced relation with respect to each other and for engaging supporting members in said receptacle, adjusting insulating means supported in said receptacle connecting with said electrode assembly interrupting the electric current through said adjustment cr regulatively positioning said electrodes for accelerating evaporation, electric terminals supported by said receptacle connecting said electrodes with an electric circuit, a bimetallic thermo-responsive element mounted in said receptacle and subjected to the hot vapors or to the hot liquid, and means for transmitting the thermo-responses of said element in cooperation with a float for actuating a liquid valve to control the liquid supply for evaporation.

24. The combination with a steam or a vapor system of a humidifier comprising a vented receptacle or receptacles connecting with said system, said receptacle or receptacles being adapted for continuous or intermittent regulated discharge to the atmosphere of vapors from said system and for the automatic disposition of condensate accumulation, a heating unit positioned in or forming a part of said receptacle or receptacles for converting into vapor said condensate, a regulative hygroscopically responsive element subjected to the atmosphere and cooperating means, including means for connecting with an electric circuit, actuated by the elongating and contracting responses of said element to effect continuous or intermittent regulated emission to the atmosphere of said vapor for controlling the relative humidity.

25. The combination with a steam or a vapor system of a humidifier comprising a vented receptacle or receptacles connecting with said system, said receptacle or receptacles being adapted for continuous or intermittent discharge to the atmosphere of vapor from said supply system and for the automatic disposition of condensate accumulation, a heating unit positioned in or forming a part of said receptacle or receptacles for converting into vapor said condensate, a thermo-responsive element subjected to the hot vapor or to the hot condensate, regulating means including means actuated by the thermo-responses of said thermo-element to effect continuous or intermittent regulated emission to the atmosphere of said vapor and regulating means connecting with said supply system to control the rate of flow of said vapor to said receptacle or receptacles.

26. The combination with a water pressure system of a humidifier comprising a vented receptacle or receptacles connecting with said system and having a supply of liquid automatically admitted continuously or intermittently, a heating unit connecting with an electric circuit evaporating liquid, means for connecting with said circuit effecting interruption or resumption of the electric current to said heating unit, a regulative hygroscopically responsive-element subjected to the atmosphere and cooperating means, including means connecting with an electric circuit, actuated by the elongating and contracting responses of said element to effect continuous or intermittent evaporation to the atmosphere of said liquid for controlling relative humidity.

27. In a humidifier of the character described emitting vapor to the atmosphere from a steam or a vapor system a vented receptacle into which a quantity of condensate automatically accumulates through continuous or intermittent emission of said vapor, means for obtaining the automatic discharge of said accumulation, means for obtaining automatic shut-off from said vapor in case of failure of said discharge of condensate and regulating means for connecting with said supply system to provide continuous or intermittent flow of vapor, said supply system serving as a mounting and a support for said humidifier.

28. The combination with a water or a steam pressure system of a humidifier comprising a vented receptacle or receptacles connecting with said system and having a supply of liquid or of vapor automatically admitted continuously or intermittently, a heating unit connecting with an electric circuit evaporating said liquid or condensate substantially at boiling temperature, means for controlling said evaporation through effecting interruption or resumption of electric current to said heating unit and interposed regulating means for connecting with said pressure system to control the rate of flow of said liquid or vapor to said receptacle or receptacles, said pressure system serving as a mounting and a support for said humidifier.

29. In combination with a water or a steam supply a humidifier comprising a receptacle in which liquid in relatively small volume is admitted for evaporation to the atmosphere, means permitting the emission of vapor from said receptacle for distribution, means adapted to provide the receptacle with liquid substantially at the rate of evaporation, means connecting with the supply and providing support for said humidifier, vapor generating means connecting with an electric circuit including means for interrupting said circuit and means for obtaining automatic shut-off in the supply of liquid.

30. In combination with a water or a steam supply a humidifier comprising a receptacle in which liquid in relatively small volume is admitted for evaporation to the atmosphere, means permitting the emission of vapor from said receptacle for distribution, means adapted to provide the receptacle with liquid from said supply substantially at the rate of evaporation, means connecting with the supply and providing support for said humidifier, vapor generating means connecting with said supply communicating heat to the liquid in said receptacle, vapor generating means connecting with an electric circuit including means for interrupting said circuit and means for automatically shutting off the supply of liquid.

31. In combination with a humidifier of the character described means adapted for the dispersion of odors to the atmosphere in the process of humidification, means positioned and co-related with said humidifier adapted to contain a reserve supply of odorant substances, means for automatically obtaining dispersion of said odors intermittently and means for obtaining automatic shut-off in the dispersion of said odors in case of interruption in the operation of said humidifier.

32. In a humidifier of the character described a receptacle having a regulated supply of liquid automatically admitted continuously or intermittently, spaced electrodes connecting with an electric circuit, a screen resisting the transmission of current extended between said electrodes and insulating means for supporting said electrodes and said screen in said receptacle.

33. In a humidifier of the character described a receptacle having a regulated supply of liquid automatically admitted continuously or intermittently, spaced electrodes connecting with an electric circuit, a screen resisting current transmission extending between said electrodes, regulating means adapted to adjust said electrodes or said screen with respect to one another for controlling the rate of evaporation of said liquid and insulating means for supporting said electrodes and said screen in one receptacle.

ELMER A. REID.

CERTIFICATE OF CORRECTION.

Patent No. 1,993,116. March 5, 1935.

ELMER A. REID.

It is hereby certified that error appears in the printed specification of the above numbered patent requiring correction as follows: Page 10, second column, line 67, for the claim number "19" read 18; and page 11, first column, line 19, claim 21, for "20" read 19; and that the said Letters Patent should be read with these corrections therein that the same may conform to the record of the case in the Patent Office.

Signed and sealed this 16th day of April, A. D. 1935.

Leslie Frazer (Seal) Acting Commissioner of Patents.